A. B. ASHMAN & A. H. NEWELL.
Improvement in Sewer Traps and Catch Basins.
No. 122,209. Patented Dec. 26, 1871.
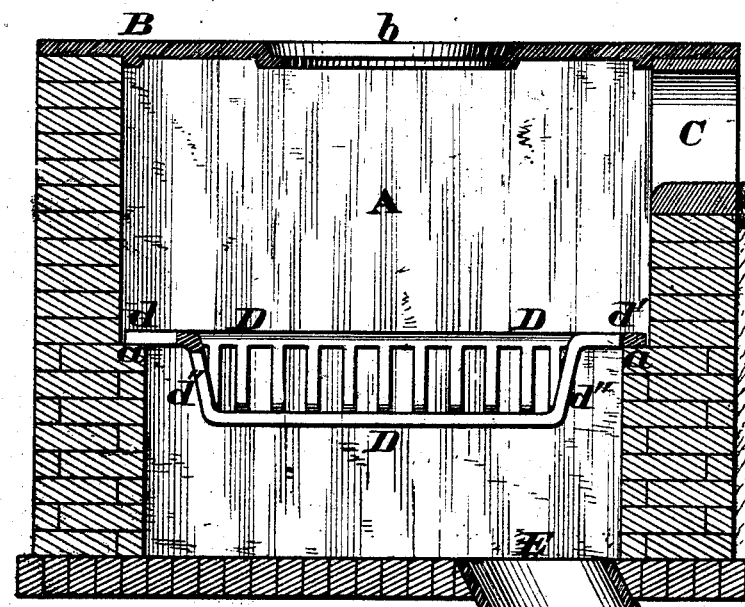
Fig. 1.
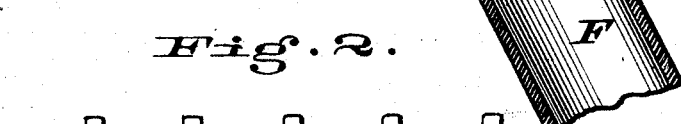
Fig. 2.
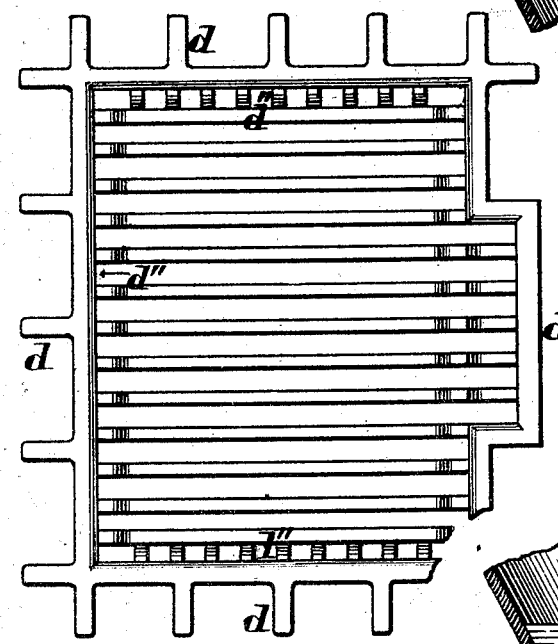
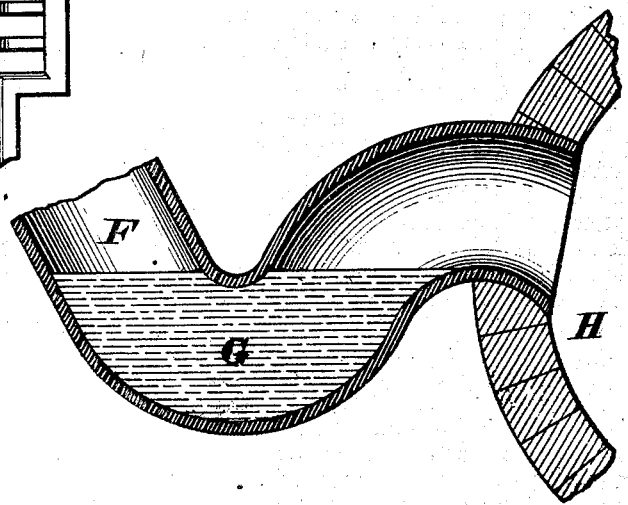
Alfred B. Ashman
Alfred H. Newell
INVENTORS.
By Knight Bros
Attys
Attest.
Jas. H. Layman
John Kiloh

UNITED STATES PATENT OFFICE.

ALFRED B. ASHMAN AND ALFRED H. NEWELL, OF CINCINNATI, OHIO.

IMPROVEMENT IN SEWER-TRAPS AND CATCH-BASINS.

Specification forming part of Letters Patent No. 122,209, dated December 26, 1871.

We, ALFRED B. ASHMAN and ALFRED H. NEWELL, both of Cincinnati, Hamilton county, Ohio, have invented an Improved Catch-Basin for Sewers, of which the following is a specification:

The first part of our invention relates to the discharge-pipe that leads from the catch-basin proper to the sewer, which pipe, in our improvement, leads from the extreme bottom of the basin, in an obliquely-descending direction, to its lower extremity, where it takes the form of a water-trap, which trap discharges directly into the sewer. The second part of our invention consists in providing the catch-basin with a depressed grating or basket that prevents bricks, stones, and other solid obstructions entering the said discharge-pipe and trap.

In the annexed drawing, Figure 1 is a vertical section of a catch-basin embodying our improvements. Fig. 2 is a plan of the grating.

A represents our catch-basin, which may have the represented rectangular form, or may have a circular, an oval, or other form, and be surmounted by a plate, B, or other customary covering, having a covered man-hole, b, of the usual construction. C is the opening, through which water flows into the catch-basin from the gutter. A ledge, a, is provided for the support, at a suitable elevation above the bottom of the basin proper, of a depressed grating or basket, D, that may consist of a congeries of bars with intervening openings, as represented, or be composed of a perforated plate or plates. This grating rests, by lugs d which extend horizontally from its upper part, upon the ledge a, and is of such exterior dimensions, relatively to said ledge, as to leave all around its brim, except at $d'$ on the side next the gutter-spout, an interval, $d''$, about four times greater than the spaces between the bars, for the spill or overflow of the liquid contents of the basket in case the latter should become clogged. The basin proper is pierced on one side, at its bottom, with an opening, E, with which communicates the upper end of an inclined discharge-pipe, F, whose lower end takes the form of a water-trap, G, which discharges directly into the sewer H.

By making the water-trap exclusively in the pipe, and not partially in the pipe and basin, as has heretofore been done, there is no opportunity allowed for the accumulation of large quantities of offensive matters in the basin, which, being much reduced in its necessary depth, both material and labor in construction are economized.

The grated basket prevents the passage of large obstructions; and any dirt or sediment which may escape through the grating and be deposited in the trap may be readily flushed out, the water, in descending the inclined flume F, acquiring abundant impetus for that purpose; and even should the trap, under the above conditions, become clogged—a thing almost impossible—the proximity of the trap to the sewer would enable ready access to the former by the latter.

The accumulations in the grated basket may be removed from time to time through the man-hole b.

This arrangement economizes over the common form in two ways, namely: first, by making the water-trap a part of the exit-pipe instead of the basin proper, as heretofore, an expense of about seventy-five dollars is saved at every basin. Secondly, it will not be necessary, as now, for two or more men to spend several hours, with derricks, scoops, buckets, and other appliances, in baling out the liquid contents of the basin in order to reach the solid and semi-solid matters—an exceedingly filthy and unhealthy occupation for the operators, and highly annoying to the entire neighborhood and even to casual passers. On the contrary, all that is requisite to keep our basin clear is for a person to occasionally visit it and remove the solid accumulations; and even should such removal be neglected and the basket become clogged, the "overfall" $d''$ will carry off all liquid matter and leave the accumulations still dry. By this means we are enabled to save at least seven-eighths of the expense and time of cleaning, and to almost wholly abolish the unhealthiness and annoyance of the operation.

We claim as new and of our invention—

1. The combination of the basin A, inlet C, basket D, outlet E, pipe F, and trap G in said pipe, all constructed and arranged to operate as and for the purposes specified.

2. In combination with the basin A, the basket or concave grating D, constructed with lugs $d$, projection $d'$, and intervening spaces $d''$ between said lugs $d$, and adapted to rest on the ledge $a$, as set forth.

In testimony of which invention we hereunto set our hands.

ALFRED B. ASHMAN.
ALFRED H. NEWELL.

Witnesses:
GEO. H. KNIGHT,
WALTER H. KNIGHT.